United States Patent
Tokutake

(10) Patent No.: US 9,823,709 B2
(45) Date of Patent: *Nov. 21, 2017

(54) CONTEXT AWARENESS BASED ON ANGLES AND ORIENTATION

(71) Applicants: SONY CORPORATION, Tokyo (JP); SONY MOBILE COMMUNICATIONS INC., Tokyo (JP)

(72) Inventor: Kenji Tokutake, Kanagawa (JP)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/176,960

(22) Filed: Jun. 8, 2016

(65) Prior Publication Data

US 2016/0282910 A1    Sep. 29, 2016

Related U.S. Application Data

(63) Continuation of application No. 14/822,494, filed on Aug. 10, 2015, now Pat. No. 9,383,783, which is a
(Continued)

(51) Int. Cl.
*H01L 29/04* (2006.01)
*G06F 1/16* (2006.01)
(Continued)

(52) U.S. Cl.
CPC .......... *G06F 1/1694* (2013.01); *G06F 1/1649* (2013.01); *G06F 3/048* (2013.01);
(Continued)

(58) Field of Classification Search
CPC .. G06F 1/1694; G06F 3/0488; G06F 3/04842; G06F 3/04817; G06F 3/048;
(Continued)

(56) References Cited

U.S. PATENT DOCUMENTS 5,426,450 A    6/1995    Drumm
6,466,198 B1   10/2002   Feinstein
(Continued)

FOREIGN PATENT DOCUMENTS

| EP | 2 071 441 A1 | 6/2009 |
|---|---|---|
| EP | 2 175 343 A1 | 4/2010 |
| JP | 2009-289039 | 12/2009 |

OTHER PUBLICATIONS

Extended European Search Report dated Mar. 24, 2015 in Patent Application No. 14155973.2.

*Primary Examiner* — Yosef Gebreyesus
(74) *Attorney, Agent, or Firm* — Oblon, McClelland, Maier & Neustadt, L.L.P.

(57) ABSTRACT

A device includes a display panel configured to display one or more interfaces. The device includes one or more motion sensors. The device includes circuitry configured to determine, based on an input from the one or more motion sensors, a tilt angle of the device. The circuitry is configured to select, based on the determined tilt angle, an interface, of the one or more interfaces, and to control the display panel to display the selected interface.

20 Claims, 9 Drawing Sheets

Related U.S. Application Data continuation of application No. 14/135,649, filed on Dec. 20, 2013, now Pat. No. 9,134,764.

(51) Int. Cl.
    *G06F 3/048*     (2013.01)
    *G06F 3/0481*     (2013.01)
    *G06F 3/0484*     (2013.01)
    *G06F 3/0488*     (2013.01)
    *H04M 1/725*     (2006.01)

(52) U.S. Cl.
    CPC ........ G06F 3/0488 (2013.01); G06F 3/04817 (2013.01); G06F 3/04842 (2013.01); H04M 1/72583 (2013.01); *G06F 2200/1637* (2013.01); *G09G 2340/0492* (2013.01); *H04M 1/72569* (2013.01); *H04M 2250/12* (2013.01)

(58) Field of Classification Search
    CPC .......... G06F 2200/1637; G06F 1/1649; H04M 1/72569; H04M 2250/12; H04M 1/72583; G09G 2340/0492
    See application file for complete search history.

(56) References Cited

U.S. PATENT DOCUMENTS

| | | |
|---|---|---|
| 6,845,408 B1 | 1/2005 | Lemke et al. |
| 7,860,644 B2 | 12/2010 | Orr et al. |
| 8,050,886 B2 | 11/2011 | Moussavi |
| 8,417,297 B2 | 4/2013 | Lee |
| 8,572,778 B2 | 11/2013 | Newkirk |
| 9,224,237 B2 | 12/2015 | Costello |
| 2006/0132675 A1 | 6/2006 | Choi |
| 2008/0228429 A1* | 9/2008 | Huang ................... G06F 1/1626 702/141 |
| 2009/0100384 A1 | 4/2009 | Louch |
| 2009/0143109 A1 | 6/2009 | Yamazaki |
| 2010/0088639 A1 | 4/2010 | Yach et al. |
| 2010/0174421 A1 | 7/2010 | Tsai et al. |
| 2011/0057875 A1* | 3/2011 | Shigeta ................... G06F 3/011 345/156 |
| 2011/0109546 A1 | 5/2011 | Milne |
| 2011/0279446 A1* | 11/2011 | Castro ................... G01C 21/20 345/419 |
| 2011/0291945 A1 | 12/2011 | Ewing et al. |
| 2011/0296351 A1 | 12/2011 | Ewing et al. |
| 2011/0313649 A1* | 12/2011 | Bales ................... G01C 21/367 701/455 |
| 2012/0276959 A1 | 11/2012 | Yamazaki |
| 2012/0284620 A1 | 11/2012 | Yach et al. |
| 2013/0036430 A1 | 2/2013 | Masaki et al. |
| 2013/0129310 A1* | 5/2013 | Shustorovich ......... H04N 5/775 386/230 |
| 2013/0201219 A1* | 8/2013 | Zhao ...................... G06F 3/012 345/649 |
| 2013/0283283 A1 | 10/2013 | Wang et al. |
| 2013/0314441 A1* | 11/2013 | Grasset ...................... G06T 1/00 345/633 |
| 2013/0321329 A1 | 12/2013 | Tokutake |
| 2014/0129994 A1 | 5/2014 | Louch |

* cited by examiner

| Orientation | Angle (θ) | x | y | z | Prioritized Application Interface |
|---|---|---|---|---|---|
| Portrait | 0 | -0.3 | 0.17 | 9.84 | — |
| | 20 | -0.07 | 1.49 | 9.71 | Browser, e-mail |
| | 70 | -0.53 | 7.76 | 6.07 | Self image capturing by camera |
| | 90 | -0.59 | 9.85 | 0.86 | — |
| Landscape | 0 | -0.28 | 0.13 | 9.9 | |
| | 20 | 3.02 | 0.24 | 9.29 | Gaming, television (TV) streaming, Video viewing application |
| | 70 | 6.22 | 0.21 | 7.43 | |
| | 90 | 9.29 | 0.28 | 0.97 | Image capture |

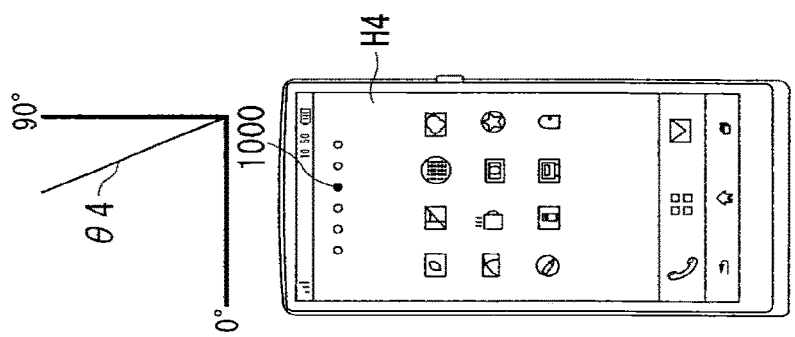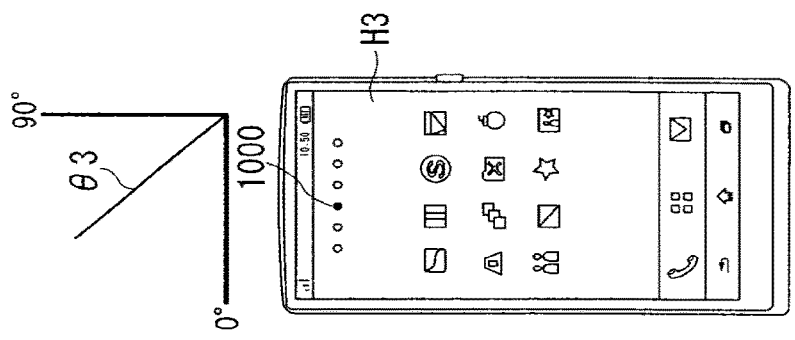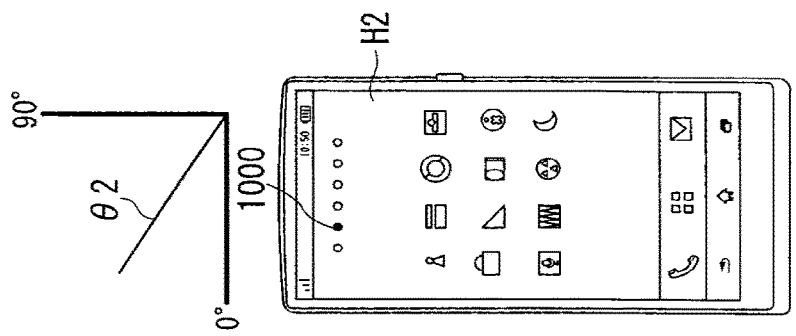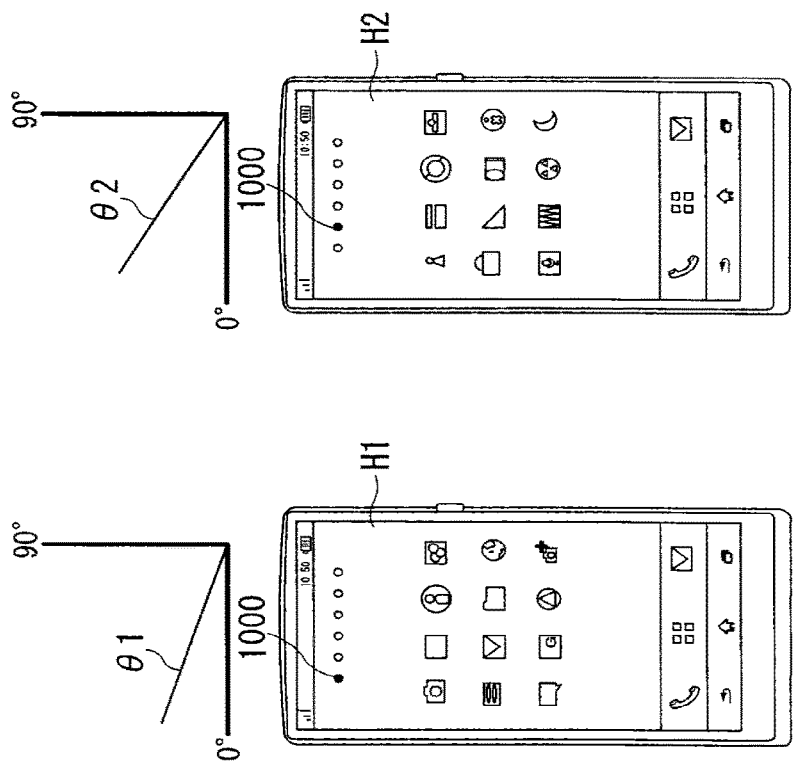

CONTEXT AWARENESS BASED ON ANGLES AND ORIENTATION

CROSS REFERENCE TO RELATED APPLICATIONS

This application is a continuation of and is based upon and claims the benefit of priority under 35 U.S.C. §120 for U.S. Ser. No. 14/822,494, filed Aug. 10, 2015, which is a continuation of U.S. Ser. No. 14/135,649 (now U.S. Pat. No. 9,134,764), filed Dec. 20, 2013; the entire contents of this application is incorporated herein by reference.

BACKGROUND

Technical Field

The present disclosure relates to detecting a manner of holding a terminal device, and controlling the aspects of the terminal device based on the detection.

Description of Related Art

Terminal devices, such as mobile telephones and smart phones, may perform processing based on instruction inputs from a user. For example, a user may manipulate operating keys and/or perform touch operations on a touch panel in order to perform a desired operation. However, such terminal devices lack predictive capability for determining a user's intentions based on other factors related to operating the terminal device, thereby reducing user friendliness and operating efficiency of the device.

SUMMARY

In one embodiment, a terminal device includes a display panel configured to display one or more interfaces. The device includes one or more motion sensors. The device includes circuitry configured to determine, based on an input from the one or more motion sensors, a tilt angle of the device. The circuitry is configured to select, based on the determined tilt angle, an interface, of the one or more interfaces, and to control the display panel to display the selected interface.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 10A through 10D illustrate a non-limiting example of interface selection based on a manner of holding a terminal device, according to certain embodiments.

DETAILED DESCRIPTION

Figure 1:
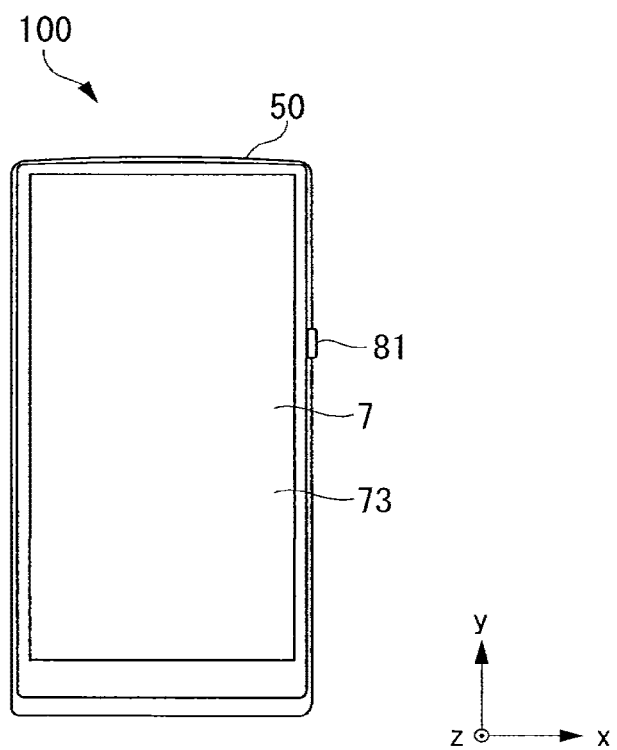
FIG. 1 illustrates a non-limiting example of a terminal device external structure, according to certain embodiments.

Referring now to the drawings, wherein like reference numerals designate identical or corresponding parts throughout the several views.

Referring first to FIG. 1, FIG. 1 illustrates a non-limiting example of a terminal device external structure, according to certain embodiments. Terminal device 100 illustrated in FIG. 1 includes a protective case 50 surrounding a display 73. The display 73 is included on a frontal surface of the terminal device 100 and, in certain embodiments, may be formed integrally with a touch panel. The touch panel may, in certain embodiments, include one or more touch sensors for detecting a touch operation on an operating surface of the display 73. Aspects of detecting a touch operation on the display 73 will be discussed later in greater detail.

The exemplary terminal device 100 of FIG. 1 includes a power key 81 disposed along an edge of the terminal device 100. In certain embodiments, in addition to providing a mechanism for cycling power to the terminal device 100, the power key 81 may be configured such that the terminal device 100 awakens from a suspended/standby mode in response to detecting an operation of the power key 81. In certain embodiments, the power key 81 may also be configured to return an interface displayed on the display 73 to a home screen interface.

FIG. 1 also illustrates multiple directional axes, which will be referenced throughout the disclosure. For the purposes of the present disclosure, the x-axis corresponds to movement in the left and right direction, the y-axis corresponds to movement upwards and downwards, and the z-axis is orthogonal to both the x-axis and the y-axis.

The exemplary terminal device 100 may, in certain embodiments, be a smartphone. However, the present disclosure is not limited to smartphones, and the processing described herein may be adapted for other devices (e.g., a tablet terminal, a laptop computer, a navigation device, a mobile telephone terminal, an electronic reading device, etc.).

Figure 2:
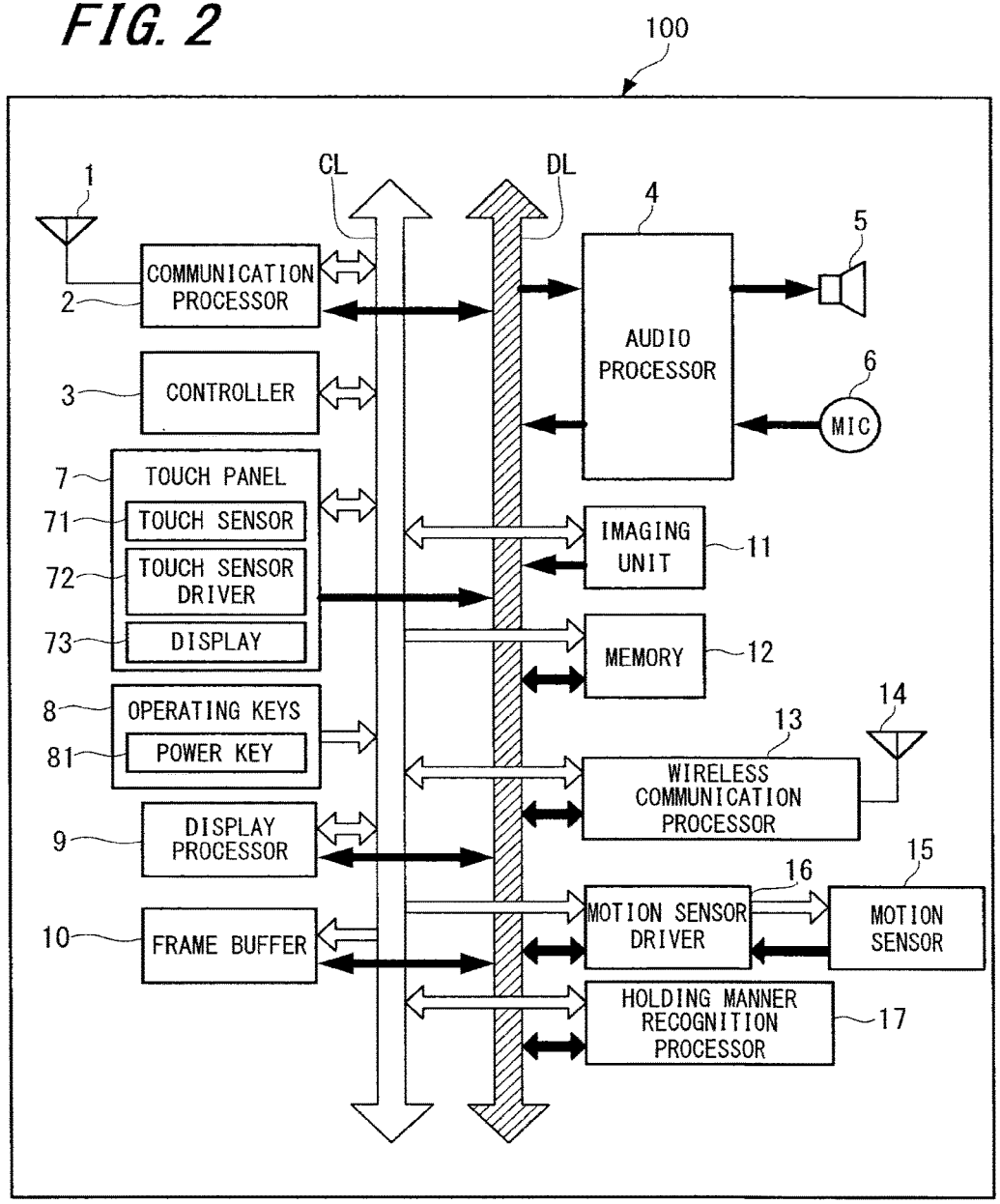
FIG. 2 illustrates a non-limiting example of a block diagram for a terminal device, according to certain embodiments.

Next, FIG. 2 illustrates a non-limiting example of a block diagram for a terminal device, according to certain embodiments.

Referring now to FIG. 2, terminal device 100 includes a controller 3, a communication processor 2 connected to an antenna 1, an audio processor 4, a speaker 5, and a microphone 6.

The controller 3 may include one or more Central Processing Units (CPUs), and may control each element in the terminal device 100 to perform features related to communication control, audio signal processing, control for the audio signal processing, still and moving image processing and control, and other kinds signal processing. The controller 3 may perform these features by executing instructions stored in a memory 12. Alternatively or in addition to the local storage of the memory 12, the features may be executed using instructions stored on an external device accessed on a network, or on a non-transitory computer readable medium.

The controller 3, in certain embodiments, may control a suspended state of the terminal device 100. The suspended state may, e.g., correspond to a low power consumption state. The controller 3 may, in certain embodiments, control the terminal device 100 to awaken from the suspended state based on a detected input, e.g., from a key included in operating keys 8 (e.g., power button 81) and/or a touch operation on touch panel 7. The controller 3 may, in certain embodiments, cause the terminal device 100 to enter the suspended state when a predetermined time interval elapses without a detected input to the terminal device 100.

In certain embodiments, the controller 3 may perform processing related to selecting an interface and/or an icon arrangement for display on the display 73 based on inputs received from holding manner recognition processor 17. For example, a manner of holding the terminal device 100 may be detected by the holding manner recognition processor 17 and in response, the controller 3 may select an interface and/or icon arrangement based on the detected manner of holding the terminal device. In certain embodiments, a determination of the manner of holding the terminal device 100 is performed when it is detected that the terminal device 100 is not in the suspended state. Aspects of display control based on a detected manner of holding the terminal device 100 will be described in detail in later paragraphs.

The memory 12 may include, e.g., Read Only Memory (ROM), Random Access Memory (RAM), or a memory array including a combination of volatile and non-volatile memory units. The memory 12 may be utilized as working memory by the controller 3 while executing the processing and algorithms of the present disclosure. Additionally, the memory 12 may be used for long-term storage, e.g., of image data and information related thereto. Further, information related to matching a detected manner of holding the terminal device 100 with an application interface, interface arrangement, and/or icon arrangement may, in certain embodiments, be stored in the memory 12.

The terminal device 100 includes a control line CL and data line DL as internal communication bus lines. Control data to/from the controller 3 may be transmitted through the control line CL. The data line DL may be used for transmission of voice data, display data, etc.

The antenna 1 transmits/receives electromagnetic wave signals between base stations for performing radio-based communication, such as the various forms of cellular telephone communication.

The communication processor 2 controls the communication performed between the terminal device 100 and other external devices via the antenna 1. For example, the communication processor 2 may control communication between base stations for cellular phone communication.

The speaker 5 emits an audio signal corresponding to audio data supplied from the audio processor 4. In certain embodiments, an audio input terminal may be included in the terminal device 100 such that audio output from the audio processor 4 may be emitted via the audio input terminal and an audio jack connected to the speaker 5. A non-limiting example of an audio jack is a 2.5 mm stereo phone connector, e.g., on personal headphones.

The microphone 6 detects surrounding audio, and converts the detected audio into an audio signal. The audio signal may then be output to the audio processor 4 for further processing.

The audio processor 4 demodulates and/or decodes the audio data read from the memory 12, or audio data received by the communication processor 2 and/or a wireless communication processor 13. Additionally, the audio processor 4 may decode audio signals obtained by the microphone 6.

The exemplary terminal device 100 of FIG. 2 may also include display 73, a touch panel 7, operating keys 8, and wireless communication processor 13 connected to an antenna 14.

The display 73 may be a Liquid Crystal Display (LCD), an organic electroluminescence display panel, or another display screen technology. In addition to displaying still and moving image data, the display 73 may display operational inputs, such as numbers or icons, which may be used for control of the terminal device 100. The display 73 may additionally display a graphical user interface such that a user may control aspects of the terminal device 100 and/or other devices. Further, the display 73 may display characters and images received by the terminal device 100 and/or stored in the memory 12 or accessed from an external device on a network. For example, the terminal device 100 may access a network such as the Internet, and display text and/or images transmitted from a Web server.

A frame buffer 10 may be included in the terminal device 100 for providing temporary memory storage for the display 73. For example, a display processor 9 may perform processing for outputting video data or an interface on the display 73. Data related to the display processing may be saved in the frame buffer 10, and the data may be read by the display processor 9 when performing display control processing.

The touch panel 7 may include a physical touch panel display screen with touch sensor 71 and a touch sensor driver 72. The touch sensor 71 may include one or more touch sensors for detecting an input operation on an operation surface of touch panel 7 display screen. The touch sensors of the touch sensor 72 may, in certain embodiments, be formed on a printed circuit board or a transparent film. Used herein, the phrase "touch operation" refers to an input operation performed by touching an operation surface of the touch panel display with an instruction object, such as a finger or stylus-type instrument. In the case where a stylus, or the like, is used in a touch operation, the stylus may include a conductive material at least at the tip of the stylus such that the sensors included in the touch sensor 7 may detect when the stylus approaches/contacts the operation surface of the touch panel display (similar to the case in which a finger is used for the touch operation).

In certain aspects of the present disclosure, the touch panel 7 may be disposed adjacent to the display 73 (e.g., laminated), or may be formed integrally with the display 73. For simplicity, the present disclosure assumes the touch panel 7 is formed integrally with the display 73 and therefore, examples discussed herein may describe touch operations being performed on the surface of the display 73 rather than the touch panel 7. However, the skilled artisan will appreciate that this is not limiting.

For simplicity, the present disclosure assumes the touch panel 7 is a capacitance-type touch panel technology; however, it should be appreciated that aspects of the present disclosure may easily be applied to other touch panel types (e.g., resistance type touch panels) with alternate structures. In certain aspects of the present disclosure, the touch panel 7 may include transparent electrode touch sensors arranged in the X-Y direction on the surface of transparent sensor glass.

The touch sensor driver 72 may be included in the touch panel 7 for control processing related to the touch panel 7, such as scanning control. For example, the touch sensor driver 72 may scan each sensor in an electrostatic capacitance transparent electrode pattern in the X-direction and Y-direction and detect the electrostatic capacitance value of each sensor to determine when a touch operation is performed. The touch sensor driver 72 may output a coordinate and corresponding electrostatic capacitance value for each sensor. The touch sensor driver 72 may also output a sensor identifier that may be mapped to a coordinate on the touch panel 7 display screen. Additionally, the touch sensor driver 72 and touch panel sensor 71 may detect when an instruction object, such as a finger, is within a predetermined distance from an operation surface of the touch panel 7 display screen. That is, the instruction object does not necessarily need to directly contact the operation surface of the touch panel 7 display screen for touch sensors to detect the instruction object and perform processing described herein. For example, in certain embodiments, the touch panel 7 may detect a position of a user's fingers around an edge of the display 73 (e.g., gripping the protective case 50 that surrounds the display 73 in FIG. 1). Signals may be transmitted by the touch sensor driver 72, e.g., in response to a detection of a touch operation, in response to a query from another element, based on timed data exchange, etc.

Next, the operating keys 8 may include one or more buttons or similar external control elements, which may generate an operation signal based on a detected input by the user. In addition to outputs from the touch panel 7, these operation signals may be supplied to the controller 3 for performing related processing and control. In certain aspects of the present disclosure, the processing and/or functions associated with external buttons and the like may be performed by the controller 3 in response to an input operation on the touch panel display screen rather than the external button, key, etc. In this way, external buttons on the terminal device 100 may be eliminated in lieu of performing inputs via touch operations, thereby improving water-tightness.

The power key 81 for controlling the power supply for the terminal device 100 may be included in the operating keys 8. In certain embodiments, when the controller 3 detects the power key 81 is pressed while the terminal device 100 is in a suspended state, the controller 3 releases the terminal device 100 from the suspended state and displays, e.g., a home screen interface on the display 73. Otherwise, a lock screen may be displayed until the controller 3 releases the terminal device 100 from the suspended state.

The antenna 14 may transmit/receive electromagnetic wave signals to/from other external apparatuses, and the wireless communication processor 13 may control the wireless communication performed between the other external apparatuses. Bluetooth, IEEE 802.11, and near-field communication (NFC) are non-limiting examples of wireless communication protocols that may be used for inter-device communication via the wireless communication processor 13.

Next, the terminal device 100 may include an imaging unit 11 for capturing still and moving image data. In certain embodiments, the imaging unit 11 may by a charge-coupled device (CCD), Complementary Metal Oxide Semiconductor (CMOS) device, or the like.

In certain embodiments, the terminal device 100 may include a motion sensor 15. The motion sensor 15 may detect features of motion, orientation, and/or location of the terminal device 100. For example, the motion sensor 15 may include an accelerometer, a gyroscope, a geomagnetic sensor, a geolocation sensor, etc., or a combination thereof, to detect features related to motion, orientation, etc. of the terminal device 100. Exemplary features related to motion of the terminal device 100 that may be detected by the motion sensor 15 include, but are not limited to, an orientation of the display 73 (e.g., landscape, portrait, etc.) and a tilt angle of the terminal device 100. In certain embodiments, motion features such as display orientation and tilt angle may be calculated based on an acceleration of the terminal device 100. In certain embodiments, the motion sensor 15 may generate a detection signal that includes data representing the detected motion. The detection signal may be transmitted, e.g., to the controller 3 and/or the holding manner recognition processor 17, where further processing may be performed based on data included in the detection signal.

A motion sensor driver 16 may be included for controlling the motion sensor 15. For example, an acceleration sensor included in the motion sensor 15 may detect an acceleration of the terminal device in the x/y/z direction, and the motion sensor driver 16 may control the motion sensor 15 to generate a detection signal including the detected acceleration. The motion sensor driver 16 may then output the detection signal via the data line DL to the holding manner recognition processor 17. The holding manner recognition processor 17 may, in certain embodiments, determined a display orientation (e.g., landscape or portrait) and a tilt angle of the terminal device 100 based on the received detection signal. The holding manner recognition processor 17 may then output a signal to the controller 3 indicating the detected holding manner of the terminal device 100, and the controller 3 may perform display control processing (e.g., interface selection, icon arrangement selection, etc.) based on the determined manner of holding the terminal device 100.

Figures 3A, 3B:
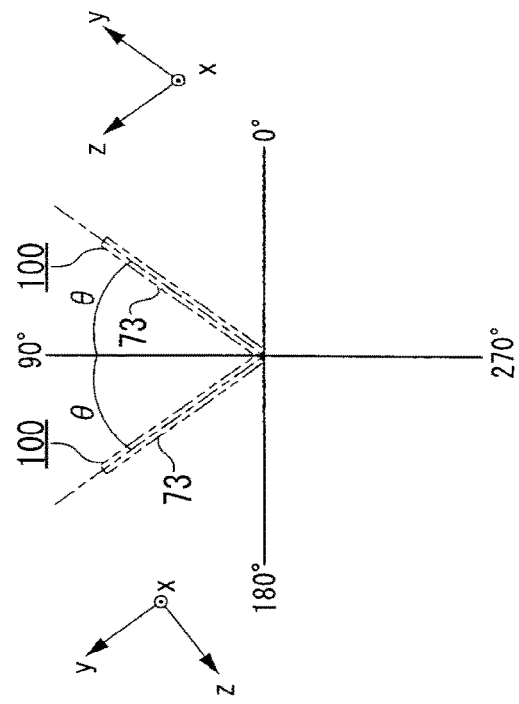
FIGS. 3A and 3B illustrate a non-limiting example of determining an application interface to display on a terminal device based on a manner of holding the terminal device, according to certain embodiments.

Next, FIGS. 3A and 3B illustrate a non-limiting example of determining an application interface to display on a terminal device based on a manner of holding the terminal device, according to certain embodiments.

Referring first to FIG. 3A, FIG. 3A illustrates a non-limiting exemplary table for selecting a prioritized application interface based on a detected manner of holding a terminal device. According to this example, the application interface may be selected by the controller 3 based on one or more of a determined display orientation and tilt angle (θ) of the terminal device 100, which may be detected based on an acceleration of the terminal device 100. In certain embodiments, the prioritized application interfaces illustrated in FIG. 3A may be determined in advance by associating an application interface with the combination of data illustrated in the figure. For example, the user may exhibit a particular manner of holding the terminal device 100 when, e.g., viewing a browser interface. In this example, the orientation, tilt angle, and acceleration data that are typically associated with the user's viewing of the browser interface may be determined and stored as device settings, e.g., in the memory 12. Subsequently, the orientation, tilt angle, and acceleration of the terminal device 100 may be detected and compared with the stored settings. When the detected values are compared with the stored device setting values and a match is determined (within a predetermined threshold), the controller 3 may, in certain embodiments, select an application interface associated with the detected matched values and display the application interface on the display 73.

The skilled artisan will appreciate that the selection of an interface for display on the terminal device 100 may also include executing other processing related to the selected interface. For example, when the controller 3 determines that a photography interface should be displayed based on the detected manner of holding the terminal device 100, the controller 3 may start an application associated with the interface (e.g., perform a start-up routine for the imaging unit 11), as well as other background processing associated with the interface.

Referring now to FIG. 3B, FIG. 3B illustrates a graphical representation of the tilt angle θ. The tilt angle, for the purposes of the present disclosure, may correspond to the polar angle formed by the display 73 on a plane formed by the y and z-axes. However, other measurement methods for tilt angle may be applied, and the example of FIG. 3B is not limiting.

Referring back to FIG. 3A, FIG. 3A illustrates specific exemplary values for display orientation, tilt angle, and acceleration that may be applied when selecting an application interface based on a manner of holding the terminal device 100. As a specific example of selecting an application interface based on a manner of holding the terminal device 100, the holding manner recognition processor 17 may determine, based on motion sensor 15 inputs, that the terminal device 100 is held in a portrait orientation with a 20° tilt angle, and with a measured acceleration in the x-axis of −0.07, a measured acceleration in the y-axis of 1.49, and a measured acceleration in the z-axis of 9.71. Based on these values, the controller 3 may select an application interface corresponding to one or more of a browser and an email application, which are application interfaces that are typically associated with the detected manner of holding the terminal device 100 under these conditions.

As a further example, the holding manner recognition processor 17 may determine that the terminal device 100 is held in a landscape orientation with a tilt angle of 70°, and a measured acceleration in the x-axis of 6.22, a measured acceleration in the y-axis of 0.21, and a measured acceleration in the z-axis of 7.43. Based on these values, the controller 3 may select one or more of a gaming interface, a television streaming interface, and a video viewing application interface, which are interfaces typically associated with a detected manner of holding the terminal device 100 under these conditions. The controller 3 may then control the display 73 such that one or more of the selected interfaces are displayed.

Further, in certain embodiments, the controller 3 may select an icon arrangement for one or more of the selected interfaces, and control the arrangement of the icons within the interfaces based on the determined manner of holding the terminal device 100. Moreover, the controller 3 may, in certain embodiments, determine an icon arrangement outside the selected interface. For example, the controller 3 may determine an arrangement of home screen icons around the displayed interface. Moreover, in certain embodiments, the controller 3 may determine, based on the detected manner of holding the terminal device 100, an arrangement of interfaces and/or corresponding interface windows.

The skilled artisan will appreciate that the values provided in the illustrative example of FIGS. 3A and 3B are in no way limiting, and any arbitrary value of tilt angle, display orientation, and/or acceleration may be applied to processing in accordance with the present disclosure. Further, the application interfaces associated with the values illustrated in FIG. 3A are provided merely for illustration purposes, and the present disclosure is not limited to selecting any particular application interface based on any particular detected manner of holding the terminal device 100.

Next, FIGS. 4A through 4H illustrate non-limiting examples of selecting an interface and/or icon arrangement based on a detected manner of holding a terminal device, according to certain embodiments. The examples illustrated in FIGS. 4A through 4H show an exemplary manner of holding the terminal device 100 and a corresponding selection of one or more interfaces and/or an icon arrangement based on the detected manner of holding the terminal device 100.

Figure 4A:
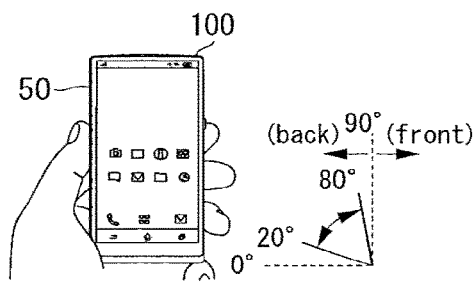
FIGS. 4A through 4H illustrate non-limiting examples of selecting an interface and/or icon arrangement based on a manner of holding a terminal device, according to certain embodiments.

Referring first to FIG. 4A, FIG. 4A illustrates a user holding the terminal device 100 in a portrait orientation with a tilt angle between 20° and 80°. In certain embodiments, the illustrated manner of holding the terminal device 100 of FIG. 4A may correspond to a typical condition in which the user views a web browser and/or an email application interface. Thus, in response to detecting the manner of holding the terminal device 100 illustrated in the example of FIG. 4A, the controller 3 may control the display 73 to display one or more of a web browser interface and/or an email application interface.

Figure 4B:
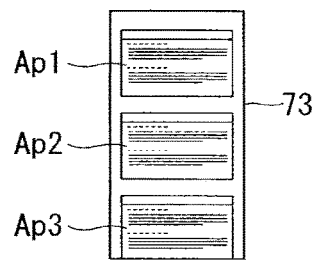

FIG. 4B illustrates a non-limiting example of displaying web browser interfaces Ap1, Ap2, and Ap3, which were selected for display on the display 73 based on the detected manner of holding the terminal device 100 as in FIG. 4A.

Figure 4C:
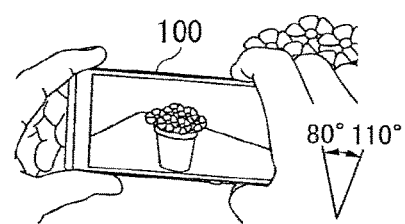

Referring now to FIG. 4C, the example of FIG. 4C illustrates a user holding the terminal device 100 in a landscape orientation with a tilt angle between 80° and 110°. In certain embodiments, the manner of holding the terminal device 100 illustrated in the example of FIG. 4C may typically correspond to the manner of holding the device when a photography interface is displayed on the terminal device 100. Thus, in certain embodiments, in response to detecting the manner of holding the terminal device 100 as illustrated in FIG. 4C, the controller 3 may select a photography interface and an icon arrangement corresponding to the photography interface for display on the terminal device 100.

Figure 4D:
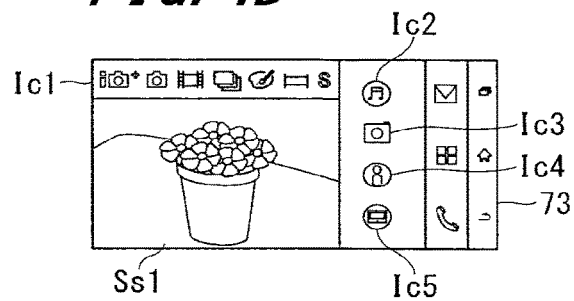

FIG. 4D illustrates a non-limiting example in which a photography interface Ss1 is displayed on the display 73 in response to detecting the manner of holding the terminal device 100 as is illustrated in FIG. 4C. Additionally, in FIG. 4D, the controller 3 selects an icon arrangement corresponding to the photography interface Ss1, and displays the icon arrangement within the photography interface Ss1 in response to detecting the manner of holding the terminal device 100 as is illustrated in FIG. 4C. For example, the controller 3 may determine an icon arrangement corresponding to icons Ic1 illustrated in FIG. 4D within the photography interface Ss1. Additionally, in certain embodiments, the controller 3 may select icon arrangements corresponding to other application interfaces that may be executed on the terminal device 100, and display the other icon arrangements together with the selected interface that was determined based on the manner of holding the terminal device. For example, in addition to displaying the photography interface Ss1 with the icon arrangement Ic1, the controller 3 may also control the display 73 to display an arrangement of icons Ic2, Ic3, Ic4, and Ic5, which correspond to other application interfaces that may be executed on the terminal device 100.

Figure 4E:
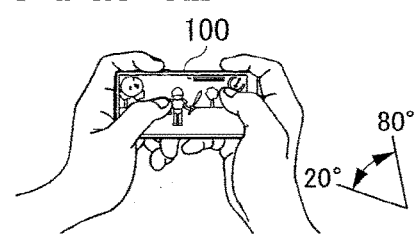

Referring now to FIG. 4E, FIG. 4E illustrates an example in which the terminal device 100 is held with a landscape orientation with a tilt angle between 20° and 80°. In certain embodiments, the manner of holding the terminal device 100 illustrated in FIG. 4E may typically correspond to a manner of holding the device when a user wishes to view a gaming interface and/or a calendar interface. Thus, in certain embodiments, the controller 3 may select a gaming interface and/or a calendar interface to display on the display 73 when it is detected that the terminal device is held in the manner illustrated in FIG. 4E.

Figure 4F:
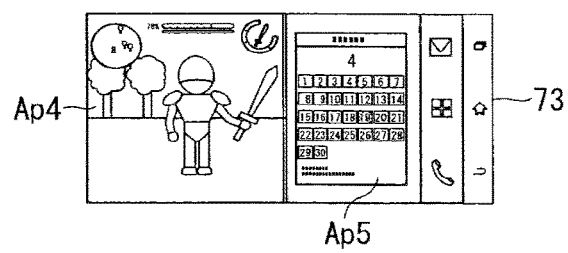

FIG. 4F illustrates a non-limiting example in which a gaming interface Ap4 and a calendar interface Ap5 are selected by the controller 3 for display on the display 73 in response to detecting the manner of holding the terminal device 100 as is illustrated in FIG. 4E. In certain embodiments, the controller 3 may select an arrangement of interfaces for display on the display 73 based on the detected manner of holding the terminal device 100. For example, in response to detecting the manner of holding the terminal device 100 as is illustrated in FIG. 4E, the controller 3 may determine an interface arrangement in which the gaming interface AP4 is displayed on the left side of the display 73 and the calendar interface AP5 is displayed on the right side of the display 73.

Figure 4G:
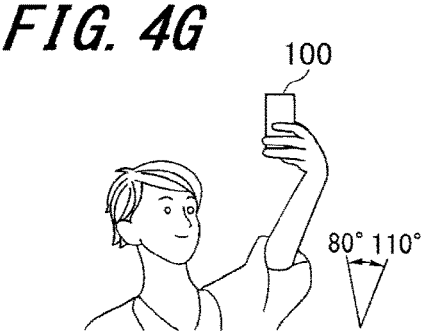

Referring now to FIG. 4G, FIG. 4G illustrates an example in which the terminal device 100 is held in a portrait orientation with a tilt angle between 80° and 110°. In certain embodiments, the manner of holding the terminal device 100 illustrated in FIG. 4G may correspond to a state in which the user is utilizing a photography interface to capture an image of the user (self-photographing) via the imaging unit 11. Thus, in response to detecting the manner of holding the terminal device 100 as in FIG. 4G, the controller 3 may, in certain embodiments, select a photography interface and/or an icon/interface arrangement corresponding to the manner of holding the terminal device 100 as is illustrated in the example of FIG. 4G.

Figure 4H:
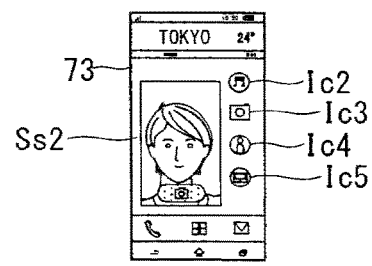

FIG. 4H illustrates a non-limiting example of selecting a photography interface Ss2 and an icon arrangement corresponding to icons Ic2, Ic3, Ic4, and Ic5, which are displayed on the display 73 in response to detecting the manner of holding the terminal device 100 as in FIG. 4G. In this example, the controller 3 controls the display 73 such that the photography interface Ss2 for controlling the imaging unit 11 is displayed on the left side of the display 73 while icons Ic2 through Ic5 are arranged on a right side of the display 73, whereby the icons Ic2 through Ic5 may correspond to a home screen interface that may be applied such that other applications and/or interfaces may be selected.

Figure 5:
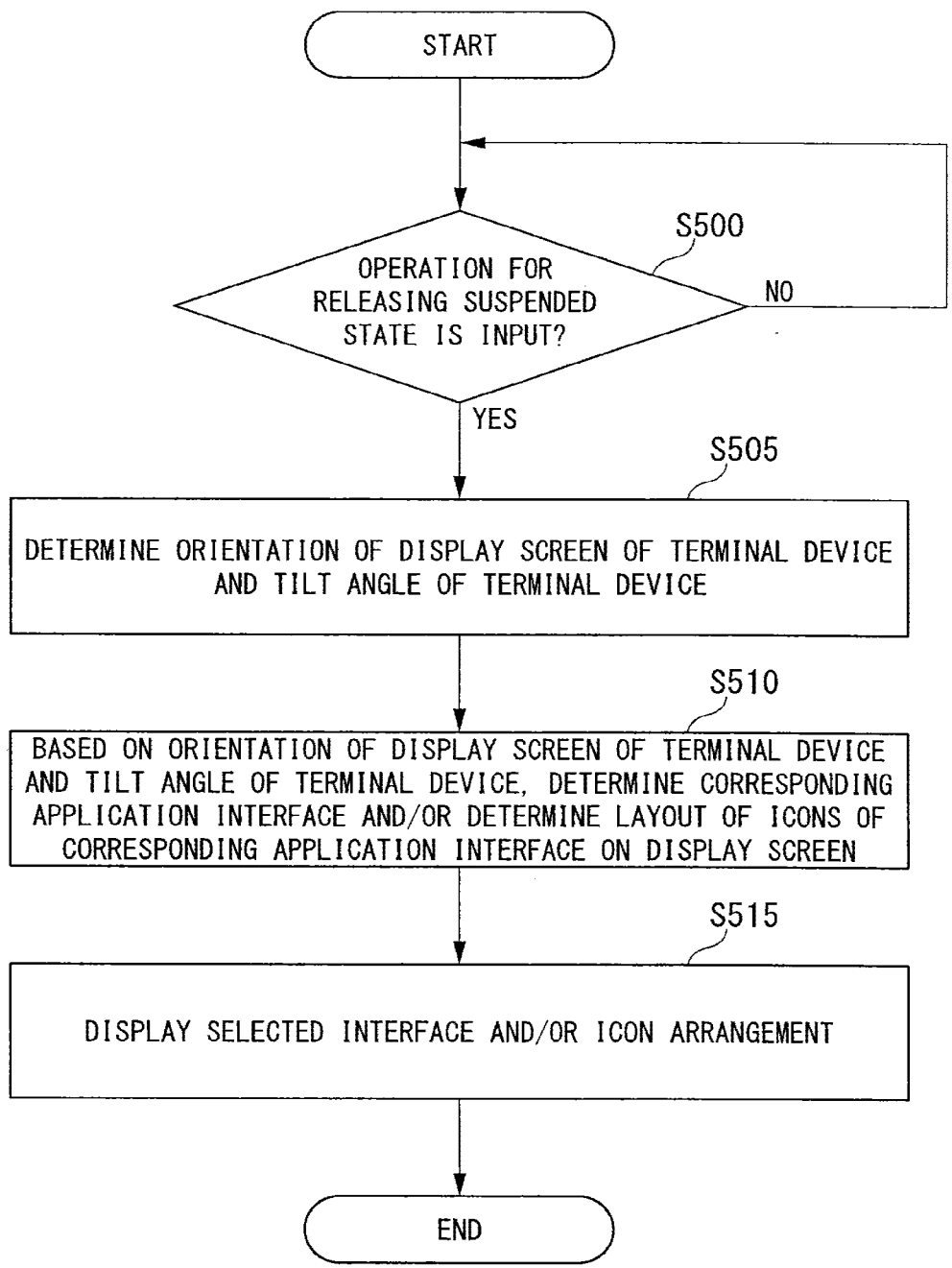
FIG. 5 illustrates a non-limiting exemplary flowchart for controlling a display based on a manner of holding a terminal device, according to certain embodiments.

Next, FIG. 5 illustrates a non-limiting exemplary flowchart for controlling a display based on a manner of holding a terminal device, according to certain embodiments. The exemplary flowchart starts at step S500 where the controller 3 determines whether an operation for releasing a suspended state of the terminal device 100 has been input. For example, the controller 3 at step S500 may determine whether the power key 81 is pressed and in response, the terminal device 100 may be released from its suspended state by, e.g., displaying a home screen interface on the display 73.

If it is determined at step S500 that an input corresponding to releasing the suspended state of the terminal device 100 has not been received, the controller 3 continues monitoring for the input. Otherwise, if an input corresponding to a release of the suspended state is received at step S500, the holding manner recognition processor 17 at step S505 determines an orientation of the display screen 73 of the terminal device 100 and a tilt angle of the terminal device 100. For example, the holding manner recognition processor 17 may acquire motion sensor data, such as acceleration data from the motion sensor 15, and determine an orientation of the terminal device 100 and the tilt angle of the terminal device 100 based on the motion sensor data.

Based on the orientation and tilt angle determined at step S505, the controller 3 at step S510 determines a corresponding application interface and/or determines a layout of icons within the corresponding application interface and/or other interfaces. For example, based on the detected manner of holding the terminal device 100 determined in step S505, the manner of holding the terminal device 100 may be matched to one or more corresponding application interfaces typically associated with the detected manner of holding the terminal device 100.

At step S515, the controller 3 controls the display 73 such that the selected application interface(s) and/or the determined layout of icons within the interface are displayed on the display 73.

According to features of embodiments described in the present disclosure, an optimal application interface and/or layout of application interfaces/icons may be selected based on a detected manner of holding the terminal device 100. Thus, depending on the detected tilt angle of the terminal device 100 and/or the orientation of the terminal device 100 display, an interface and/or icon layout on a home screen or other screen of the terminal device 100 may be automatically displayed based on the manner in which the terminal device is typically operated by the user. As a result, it becomes unnecessary to manually arrange icons and/or interface windows on a terminal device display based on assumptions of how the terminal device may be used. Further, it becomes unnecessary for a user to unnecessarily perform search operations for finding and selecting icons and/or application interfaces. Rather, an optimal arrangement of icons and/or interfaces may be automatically selected by the controller 3 such that the display 73 output of the terminal device 100 predicts an intended operation of the user based on the manner of holding the terminal device.

Next, in preceding examples the manner of holding the terminal device 100 may be detected based on, for example, display orientation and tilt angle, and the detected manner of holding the terminal device 100 could then be matched to an application interface and/or an icon arrangement, which were stored in advance. FIG. 3A provides an illustrative example of storing in advance a correspondence between an application interface and data related to the manner of holding the device such that a detected manner of holding the terminal device 100 may be matched to the application interface.

Rather than manually setting correspondences between interfaces and data related to the manner of holding the device, in certain embodiments, information related to the manner of holding the terminal device 100 may be detected and associated with the application interface and/or icon arrangement executed/selected at the time the interface is displayed/executed. For example, the holding manner recognition processor 17 may determine a display orientation, a tilt angle, and acceleration in the x/y/z-axis at the time a browser interface is executed on the terminal device 100. The controller 3 may then associate the browser interface with the detected information related to the manner of holding the terminal device 100 at the time the browser interface is executed, and the association between the interface and the data corresponding to the manner of holding the terminal device 100 may be stored in the memory 12. Thus, the terminal device 100, in accordance with certain embodiments discussed herein, may generate stored associations/correspondences between application interfaces and/or icon arrangements and the detected manner of holding the terminal device 100, and subsequently select and/or execute the associated application interface and/or icon arrangement when the detected manner of holding the terminal device 100 matches the associated conditions. Accordingly, the terminal device 100 learns a user's usage patterns and, in response, generates data which can predict the user's intended operation based on the detected manner of holding the terminal device 100.

Figure 6:
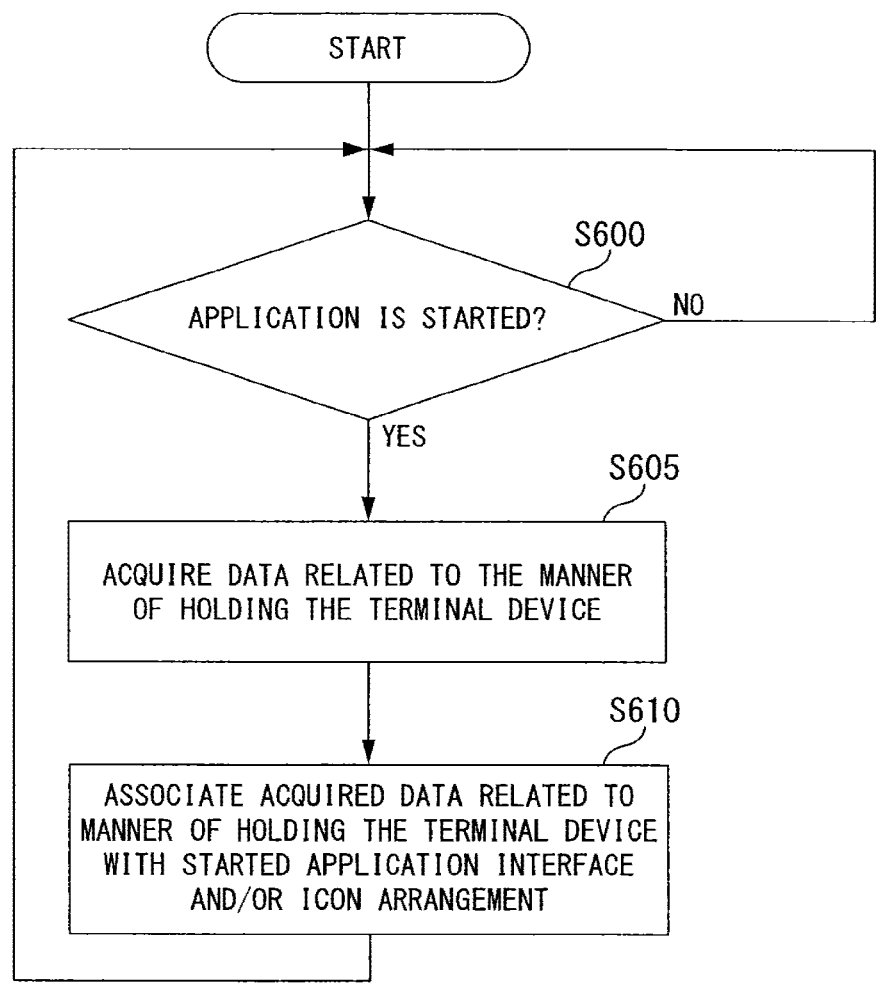
FIG. 6 illustrates a non-limiting exemplary flowchart for associating an application interface and/or icon arrangement with a detected manner of holding a terminal device, according to certain embodiments.

FIG. 6 illustrates a non-limiting exemplary flowchart for associating an application interface and/or icon arrangement with a detected manner of holding the terminal device, according to certain embodiments. The process in the example of FIG. 6 begins at step S600 where the controller 3 determines whether an application interface has started. If it is determined at step S600 that an application interface has not started, the controller 3 continues monitoring for the start of an application. Otherwise, if the controller 3 at step S600 determines that an application has started, the processing moves to step S605.

At step S605, the holding manner recognition processor 17 determines, based on sensor values obtained from the motion sensor 15, information related to the manner of holding the terminal device 100. For example, the holding manner recognition processor 17 may acquire at step S605 acceleration data of the terminal device 100, and determine the manner of holding the terminal device 100 based on the acquired data. Data such as tilt angle and display orientation may also be generated based on the acquired data, and the generated data may also be applied with the acquired data in later processing.

At step S610, the controller 3 associates the acquired and/or generated data related to the manner of holding the terminal device from step S605 with the started application interface and/or icon arrangement detected at step S600. Subsequently, when the data related to the manner of holding the terminal device 100 that was associated with the started application interface and/or icon arrangement at step S610 is detected, the controller 3 may control the display 73 such that the associated application interface and/or icon arrangement is displayed on the display 73.

Accordingly, processing features described herein provide for adaptive learning of usage patterns such that data associated with a manner of holding the terminal device may be determined over time. Additionally, the learned usage patterns may be stored such that an application interface and/or icon arrangement can be selected based on a correspondence of the application and the usage pattern.

In certain embodiments, the associations between data related to the manner of holding the terminal device 100 and the started application interface and/or arrangement detected at the time the associated data was acquired may change over time. For example, when a new application interface is installed on the terminal device 100, the holding manner recognition processor 17 and the controller 3 may perform the process illustrated in FIG. 6 such that new data is associated with the newly installed application. As a further example, as a user's usage patterns of the terminal device 100 change (e.g., by holding the terminal device in a manner that is different than the previously detected manner associated with a particular application interface and/or icon arrangement) and therefore, the controller 3 may temporally update the associated correspondence data generated in the process in accordance with FIG. 6.

Next, in preceding examples an application interface and/or icon arrangement is selected based on a detected manner of holding a terminal device (e.g. a detected display orientation and tilt angle of the terminal device). However, in certain embodiments, data other than the detected manner of holding the terminal device may be applied to aspects of the present disclosure such that an application interface and/or icon arrangement is selected. In certain embodiments, in addition to data related to the manner of holding the terminal device, data related to a behavior recognition of the user and/or a position recognition of the user/terminal device may be applied such that an application interface and/or icon arrangement may be selected and displayed on the terminal device.

Figure 7:
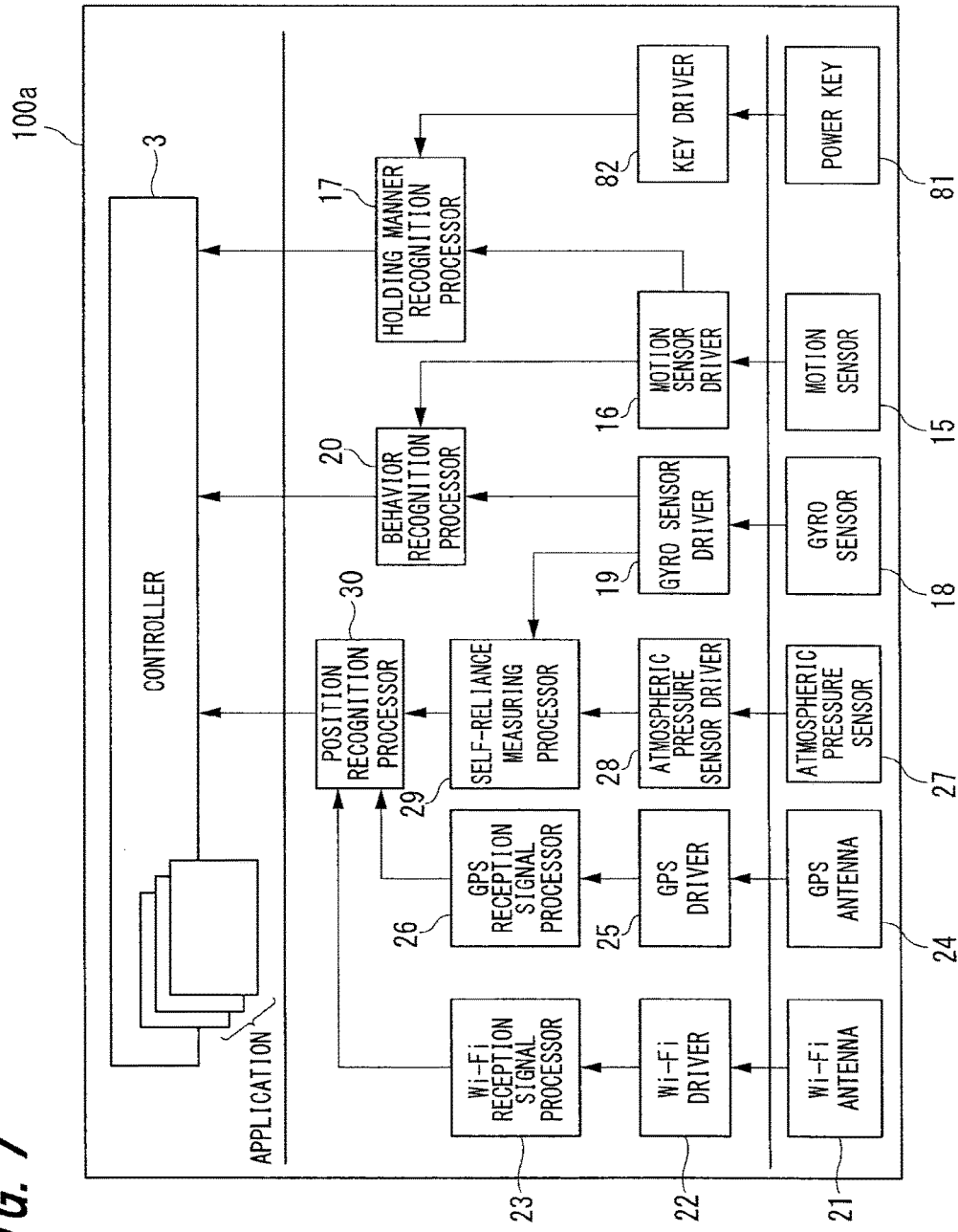
FIG. 7 illustrates another non-limiting exemplary block diagram for a terminal device, according to certain embodiments.

FIG. 7 illustrates a non-limiting exemplary block diagram for a terminal device including sensors for determining data related to user behavior recognition and/or position recognition of the device/user. Referring now to FIG. 7, a non-limiting structural example of a terminal device 100a is illustrated in the figure. The exemplary terminal device 100a includes elements previously illustrated and described with respect to FIG. 2. Accordingly, a detailed description of the repeated elements will not be provided here for the sake of brevity.

The terminal device 100a includes a behavior recognition processor 20 and a position recognition processor 30. In certain embodiments, the terminal device 100a may determine an optimum application interface and/or icon arrangement based on inputs received from the holding manner recognition processor 17, the behavior recognition processor 20, and/or the position recognition processor 30. The holding manner recognition processor 17 may determine a manner of holding the terminal device 100a based on inputs received from the motion sensor 15. Additionally, the holding manner recognition processor 17 may receive inputs based on an operation of the power key 81. For example, the holding manner recognition processor 17 may determine that the power key 81 is pressed and output a signal to the controller 3 such that the terminal device 100a is released from a suspended state.

In certain embodiments, the behavior recognition processor 20 may determine an operating context of the terminal device 100a, whereby the operating context may, e.g., represent a behavior exhibited by a user while the user is operating, or is otherwise in possession of, the terminal device 100a. For example, the behavior recognition processor 20 may determine, based on inputs from the motion sensor 15 and/or the gyro sensor 18, an action performed by the user at a time of determining the manner of holding the terminal device 100a. The gyro sensor 18 may be configured to detect an angular velocity of the terminal device 100a. A gyro sensor driver 19 supplies the angular velocity obtained by the gyro sensor 18 to the behavior recognition processor 20 and/or a self-reliance measuring processor 29. Based on the received input from the motion sensor 15 and/or gyro sensor 18, the behavior recognition processor 20 may, for example, determine an action a user is performing when operating and/or otherwise in possession of the terminal device 100a. For example, the behavior recognition processor 20 may determine that the user is performing an action corresponding to walking, boarding a train, riding a bicycle, driving a motor vehicle, etc.

In certain embodiments, the behavior recognition processor 20 may determine an operating context of the terminal device 100a based on inputs from other applications executed by the terminal device 100a. For example, the controller 3 may be configured to execute a calendar application, a fitness application such as a pedometer or speedometer, a social networking application, a travel application, a shopping application, a review application, a location check-in application, or any other application capable of being executed by the controller 3. The behavior recognition processor 20 may, in certain embodiments, determine a probable operating context associated with the inputs described in the present disclosure, and the controller 3 may perform display control processing based on the determination. Inputs from other processing units discussed herein may also be utilized by the behavior recognition processor 20 to determine a probable operating context of the terminal device 100a. For example, a position input from the position recognition processor 30 may provide an additional data point for determining the operating context.

In certain embodiments, the position recognition processor 30 recognizes a position of the terminal device 100 based on a measured value of information included in an electromagnetic wave received by Wi-Fi antenna 21. Additionally, in certain embodiments, a current position of the terminal device 100a may be determined by the position recognition sensor 30 based on inputs received from a Global Positioning Sensor (GPS) reception signal processor 26 via a GPS antenna 24 and GPS driver 25, as well as inputs received from the self-reliance measuring processor 29 via an atmospheric pressure sensor 27 and atmospheric pressure sensor driver 28.

The Wi-Fi antenna 21 may transmit/receive electromagnetic waves between Wi-Fi access points, which are not illustrated. The Wi-Fi driver 22 may control transmission/reception of the electromagnetic waves by the Wi-Fi antenna 21. In certain embodiments, the Wi-Fi driver 22 extracts signals (e.g. a beacon signal, etc.) from electromagnetic waves received by the Wi-Fi antenna 21, and outputs the extracted signals to the Wi-Fi reception signal processor 23. In certain embodiments, the Wi-Fi reception processor 23 may calculate a present position of the terminal device 100a by calculating a distance relative to a Wi-Fi access point by analyzing information contained in the signal input from the Wi-Fi driver 22. The Wi-Fi reception processor 23 may then supply information related to the present position of the terminal device 100a to the position recognition processor 30.

In certain embodiments, the GPS antenna 24 may receive an electromagnetic wave transmitted from one or more GPS satellites. The GPS driver 25 may control the receiving of electromagnetic waves by the GPS antenna 24. Moreover, in certain embodiments, the GPS driver 25 may extract a signal included in the electromagnetic waves received from the GPS antenna 24, and supply the extracted signals to the GPS reception signal processor 26. The GPS reception signal processor 26 may calculate a present location of the terminal device 100a by calculating a distance from the one or more GPS satellites by analyzing the information included in the signal input from the GPS driver 25. The GPS reception signal processor 26 may then supply the information related to the calculated present position of the terminal device 100a to the position recognition processor 30.

In certain embodiments, the air pressure sensor 27 may measure atmospheric pressure and/or an altitude with respect to the terminal device 100a. The atmospheric pressure sensor driver 28 may coordinate actions performed by the atmospheric pressure sensor 27. Additionally, the atmospheric pressure sensor driver 28 may output the detected atmospheric pressure and/or the altitude measured by the atmospheric pressure sensor 27 to the self-reliance measuring processor 29. In certain embodiments, the self-reliance measuring processor 29 may calculate a present position of the terminal device 100a based on the received information related to the atmospheric pressure and/or altitude output by the atmospheric pressure sensor driver 28. Additionally, in certain embodiments, the self-reliance measuring processor 29 may calculate the current position of the terminal device 100a based on angular velocity inputs received from the gyro sensor driver 19 via the gyro sensor 18. The self-reliance measuring processor 29 may then supply the calculated present position of the terminal device 100a to the position recognition processor 30.

In certain embodiments, the holding manner recognition processor 17, the behavior recognition processor 20, and the position recognition processor 30 may output signals to the controller 3 such that application interface selection and/or icon arrangement selection features described herein may be performed. For example, the controller 3 may select an application interface for display on the display 73 based on one or more of data related to a holding manner of the terminal device 100a, a behavior recognition of a user in possession of the terminal device 100a, and a position recognition performed by the position recognition processor 30.

Figure 8:
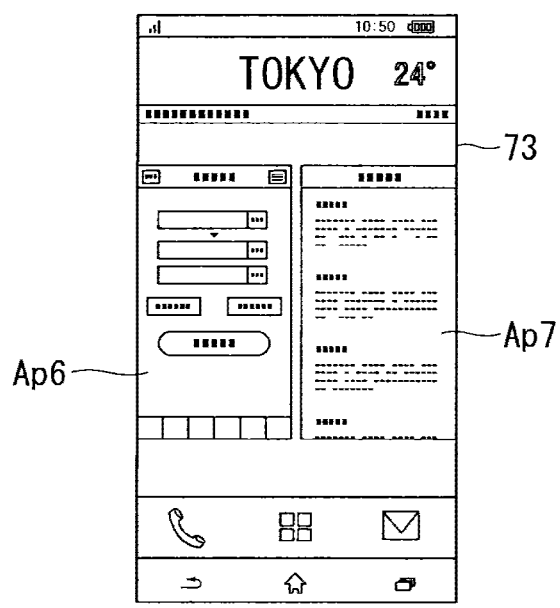
FIGS. 8 and 9 illustrate non-limiting examples of display control based on a manner of holding a terminal device and based on a recognition of features relating to a an operating context of the device, according to certain embodiments.
Figure 9:
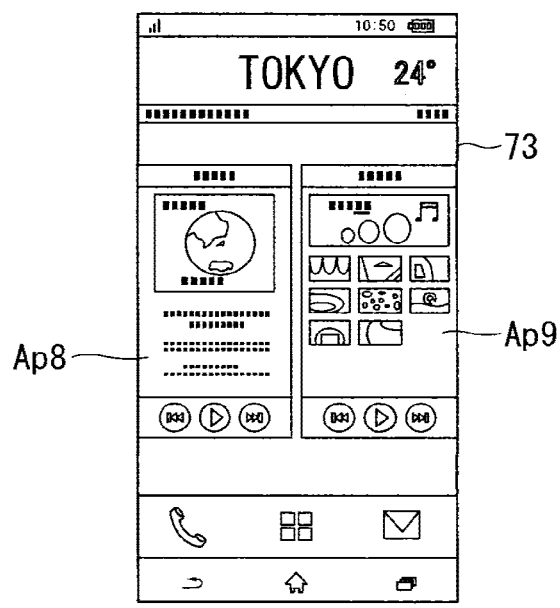

FIGS. 8 and 9 illustrate non-limiting examples of display control based on a manner of holding a terminal device and based on a recognition of features relating to a an operating context of the device, according to certain embodiments.

Referring first to FIG. 8, FIG. 8 illustrates a non-limiting example of an optimal application interface selection based on a detected manner of holding the terminal device 100a, as well as a detection of data related to a position of the device/user and/or a detected behavior of the user operating the terminal device 100a. In certain embodiments, the example of FIG. 8 may correspond to a home screen interface displayed on the display 73. In this example, a layout arrangement of the home screen interface displayed on the display 73 may be based on a determination by the holding manner recognition processor 17 that the terminal device 100a is held in a portrait display orientation with a tilt angle between 20° and 80°. Additionally, the controller 3 may control the output of the display 73 such that the interface shown in FIG. 8 is output based on a determination that the user operating the terminal device 100a is boarding a train. For example, the behavior recognition processor 20 may determine that the user is boarding a train based, e.g., on an analysis of a calendar interface included in the terminal device 100a. Additionally, the behavior recognition processor 20 may determine that the user is boarding a train based on data indicating that the user has purchased a train ticket for a particular departure time and/or checked in for boarding on the train. Further, the determination that the user is boarding a train may be based on a detection by the position recognition processor 30 that the terminal device 100a is in a train station and/or has a travel path corresponding to a train track.

In response to detecting a manner of holding the terminal device 100a and the detected behavior of the user operating the terminal device 100a, the controller 3 controls the display 73 such that an arrangement of the home screen interface in the example of FIG. 8 includes a guidance interface Ap6 and a browser interface Ap7. Accordingly, an optimal application interface selection and/or arrangement determination based on the detected holding manner of the terminal device 100a, as well as the detected behavior of a user (i.e., an operating context), is output such that the home screen interface displays information that is suitable to the user's current condition, behavior, and manner of holding the device.

Next, FIG. 9 illustrates a non-limiting example in which an optimal interface arrangement is determined based on a detection of a manner of holding the terminal device 100a, as well as a detection of an audio jack being inserted into the terminal device 100a. In this example, it is assumed that the terminal device 100a includes an audio jack input terminal such that, for example, headphones having an audio jack (e.g., speaker 5) may be connected to the terminal device 100a for outputting audio. Thus, in response to detecting that an audio jack is inserted into the terminal device 100a, in certain embodiments, the behavior recognition processor 20 may detect the insertion of the headphones. The holding manner recognition processor 17 may also determine that the terminal device 100a is held with a portrait display orientation and a tilt angle between 20° and 80°. Thus, based on the combination of the detection of the headphone jack insertion by the behavior recognition processor 20 and the detected manner of holding the terminal device 100a by the holding manner recognition processor 17, the controller 3 controls the output of the display 73 such that an interface as is illustrated in the example of FIG. 9 is displayed. The exemplary interface of FIG. 9 includes a music player interface Ap8 and a podcast player interface Ap9, which are determined to be suitable application interfaces based on the detected operating context and manner of holding the terminal device 100a.

Next, FIGS. 10A through 10D illustrate non-limiting examples of interface selection processing based on a manner of holding a terminal device, according to certain embodiments. In each of the examples illustrated in FIGS. 10A through 10D, a home screen interface is illustrated as including a plurality of icons. In certain embodiments, icons included in a home screen interface may span across multiple home screen interface pages. For example, in order to preclude the inclusion of an overwhelming number of icons in any particular interface screen, home screen interface icons may be separated into separate pages, whereby the user may select the separate interface home screen interface pages by, e.g., performing a "swipe" touch operation to scroll through the interface pages. Rather than performing a touch operation such as a swipe to change the displayed screen, aspects of the present disclosure may be applied such that the interface display screen is changed based on a detected manner of holding the terminal device.

Referring to the example illustrated in FIG. 10A, a terminal device is illustrated with a home screen interface H1. At a top area of the home screen interface H1, a series of six small circles represents the six home screen interface display screens that may be displayed as part of the home screen interface. In this example, a current screen indicator 1000 is illustrated as a darkened circle that represents which of the plurality of interface screen pages is currently displayed on the terminal device. In the example of FIG. 10A, it is assumed that the home screen interface H1 represents the first of a total of six home screen interface screens that may be displayed on the terminal device as part of a complete home screen interface.

In certain embodiments, a home screen interface screen, of a plurality of home screen interface screens included in a home screen interface, may be associated with a detected tilt angle (or range of tilt angles) of the terminal device. Thus, based on the detected tilt angle of the terminal device, the desired home screen interface screen may be selected for display on the terminal device. Moreover, in certain embodiments, the current home screen interface screen displayed on the terminal device may be changed based on a detected change in terminal device tilt angle.

Referring again to the example of FIG. 10A, FIG. 10A illustrates a graph showing tilt angle $\theta1$ at an upper portion of the figure. In this example, when the holding manner recognition processor 17 detects that the tilt angle is between zero degrees and an angle corresponding to $\theta1$, the controller 3 controls the output of the display such that home screen interface H1 is displayed.

Next, FIG. 10B illustrates an example in which a home screen interface H2 is displayed on the terminal device based on the detected tilt angle. In this example, the holding manner recognition processor 17 determines that the tilt angle of the terminal device is between the angle corresponding to $\theta1$ and an angle corresponding to a tilt angle $\theta2$. In response to determining the tilt angle is within the illustrated range, the controller 3 controls the output of the display such that the home screen interface screen is changed from the home screen interface H1 of FIG. 10A to the home screen interface H2 illustrated in FIG. 10B.

Next, FIG. 10C illustrates an example in which a home screen interface H3 is displayed on a terminal device based on a detected tilt angle. In this example, the holding manner recognition processor 17 may determine that the tilt angle of the terminal device is between the tilt angle $\theta2$ of FIG. 10B and a tilt angle $\theta3$ illustrated in FIG. 10C. In response to determining the tilt angle of the terminal device is within the illustrated range, the controller 3 controls the output of the display such that the home screen interface screen is changed from home screen interface H2 of FIG. 10B to the home screen interface H3 illustrated in FIG. 10C.

Next, FIG. 10D illustrates an example in which a home screen interface H4 is displayed on a terminal device based on a detected tilt angle. In this example, the holding manner recognition processor 17 may determine that the tilt angle of the terminal device is between the tilt angle $\theta3$ of FIG. 10C and a tilt angle $\theta4$ illustrated in FIG. 10D. In response to determining the tilt angle of the terminal device, the controller 3 may control the output of the display such that the home screen interface screen displayed on the terminal device changes from home screen interface H3 to home screen interface H4.

In accordance with the exemplary features described above with respect to FIGS. 10A through 10D, a user may control the output of a home screen interface screen based on a detected tilt angle of the terminal device. It should be appreciated that the home screen interface control feature as described herein are not limited only to a change in home screen interface screens. Rather, the features discussed herein may be applied such that other display control may be performed. For example, a terminal device may include an application interface for displaying still images. In this example, individual images may be displayed on a display 73, and a plurality of images stored on the terminal device may be selected by scrolling through the images. Thus, by applying the features discussed above with respect to changing an interface screen based on a detected change in tilt angle, a user may scroll through individual images in an album based on a detected change in tilt angle of the terminal device. That is, an image, of a plurality of images stored on the terminal device, may be displayed on the display 73, and a new image, of the plurality of images, may be displayed on the display 73 based on a detected change in tilt angle of the terminal device.

In certain embodiments, a range of tilt angles corresponding to images stored on the terminal device may be calculated based on a number of images stored on the terminal device. For example, a range of tilt angles (e.g. 0 to 90 degrees) may be divided by the total number of images stored on the terminal device such that each stored image is assigned a corresponding range of the tilt angles. Similarly, a range of tilt angles corresponding to interface screens may be determined by dividing the total tilt angle range by the number of screens in the interface.

Obviously, numerous modifications and variations of the present disclosure are possible in light of the above teachings. It is therefore to be understood that within the scope of the appended claims, the present disclosure may be practiced otherwise than as specifically described herein. For example, advantageous results may be achieved if the steps of the disclosed techniques were performed in a different sequence, if components in the disclosed systems were combined in a different manner, or if the components were replaced or supplemented by other components.

Further, examples discussed herein describe determining an interface, icon arrangement, and/or interface arrangement based on a detected manner of holding a terminal device, a position determination result, a behavior recognition result, etc. However, the present disclosure is not limited to the aforementioned determinations. For example, applications known as "small applications" may be selected based on processing features described herein, and the small applications may be displayed in an area within the terminal device display or within another displayed application.

Further, examples discussed herein describe determining the manner of holding a terminal device based on acceleration values. However, the determination of the manner of holding the terminal device is not limited to calculations including acceleration, and other sensor inputs, such as the various sensors described herein, may also be applied in the determination.

Further, the determination of the manner of holding the terminal device is not limited to the tilt angle and display orientation. Rather, the determination may be based on tilt angle or display orientation alone, or may be based on other inputs. For example, the manner of holding the terminal device may also be based on detected touch sensor outputs indicating a position of a user's fingers with respect to the touch panel display screen.

The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) A device comprising: a display panel configured to display one or more interfaces; one or more motion sensors; and circuitry configured to determine, based on an input from the one or more motion sensors, a tilt angle of the device; select, based on the determined tilt angle, an interface, of the one or more interfaces; and control the display panel to display the selected interface.

(2) The device according to (1), wherein: the circuitry is configured to determine, based on the input from the one or more motion sensors, a display orientation of the device, and the circuitry is configured to select the interface based on the tilt angle and the display orientation.

(3) The device according to (1) or (2), wherein: the circuitry is configured to determine an arrangement of icons based on the determined tilt angle, and the circuitry is configured to control the display panel to display the arrangement of icons.

(4) The device according to any one of (1) to (3), wherein: the arrangement of icons corresponds to the selected interface, and the circuitry is configured to display the arrangement of icons within the selected interface based on the determined tilt angle.

(5) The device according to any one of (1) to (4), wherein the circuitry is configured to select the interface, of the one or more interfaces, based on a previously determined correspondence between the selected interface and the determined tilt angle, and the correspondence is generated by acquiring, from the one or more motion sensors, data corresponding to the tilt angle when an application corresponding to the interface is executed, and associating the interface with the acquired data corresponding to the tilt angle.

(6) The device according to any one of (1) to (5), further comprising: one or more position sensors configured to determine a current location of the device, wherein the circuitry is configured to select the interface based on the determined tilt angle and the current location of the device.

(7) The device according to any one of (1) to (6), wherein the circuitry is configured to determine an operating context of the device based on inputs from at least one of the one or more motion sensors and the one or more position sensors.

(8) The device according to any one of (1) to (7), wherein the operating context includes a behavior exhibited by a user at a time of determining the tilt angle.

(9) The device according to any one of (1) to (8), further comprising: an audio input terminal configured to receive an audio jack, wherein the circuitry is configured to determine when the audio jack is received by the audio input terminal, and the circuitry is configured to select the interface, of the one or more interfaces, based on the determined tilt angle and the determination result of whether the audio jack is received by the audio input terminal.

(10) The device according to any one of (1) to (9), wherein when the interface, of the one or more interfaces, includes a plurality screens that may be selected for display on the display panel, a range of tilt angles is associated, by the circuitry, with each screen of the plurality of screens, and the circuitry is configured to display a screen, of the plurality of screens, based on a comparison between the determined tilt angle and the range of tilt angles associated with each screen.

(11) A method of controlling a display panel configured to display one or more interfaces, the method comprising: determining, based on an input from one or more motion sensors, a tilt angle of the display panel; selecting, based on the determined tilt angle, an interface, of the one or more interfaces; and controlling the display panel to display the selected interface.

(12) The method according to (11), further comprising: determining, based on the input from the one or more motion sensors, a display orientation of the display panel, wherein the interface is selected based on the tilt angle and the display orientation.

(13) The method according to (11) or (12), further comprising: determining an arrangement of icons based on the determined tilt angle; and controlling the display panel to display the arrangement of icons.

(14) The method according to any one of (11) to (13), wherein: the arrangement of icons corresponds to the selected interface, and the display panel displays the arrangement of icons within the selected interface based on the determined tilt angle.

(15) The method according to any one of (11) to (14), wherein the interface, of the one or more interfaces, is selected based on a previously determined correspondence between the selected interface and the determined tilt angle, and the correspondence is generated by acquiring, from the one or more motion sensors, data corresponding to the tilt angle when an application corresponding to the interface is executed, and associating the interface with the acquired data corresponding to the tilt angle.

(16) The method according to any one of (11) to (15), further comprising: determining, based on an input from one or more position sensors, a current location of the display panel, wherein the interface is selected based on the determined tilt angle and the current location of the display panel.

(17) The method according to any one of (11) to (16), further comprising: determining an operating context of the display panel based on inputs from at least one of the one or more motion sensors and the one or more position sensors.

(18) The method according to any one of (11) to (17), further comprising: determining when an audio jack is received by an audio input terminal included on the display panel, wherein the interface, of the one or more interfaces, is selected based on the determined tilt angle and the determination result of whether the audio jack is received by the audio input terminal.

(19) The method according to any one of (11) to (18), further comprising associating, when the selected interface includes a plurality screens that may be selected for display on the display panel, a range of tilt angles with each screen of the plurality of screens; and displaying a screen, of the plurality of screens, based on a comparison between the detected tilt angle and the range of tilt angles associated with each screen.

(20) A non-transitory computer readable medium having instructions stored therein that when executed by one or more processors cause the one or more processors to perform a method of controlling a display panel configured to display one or more interfaces, the method comprising: determining, based on an input from one or more motion sensors, a tilt angle of the display panel; selecting, based on the determined tilt angle, an interface, of the one or more interfaces; and controlling the display panel to display the selected interface.

The invention claimed is:

1. A device comprising:
a display; and
circuitry configured to
receive a signal indicative of a tilt angle based on an output from one or more motion sensors;
select, based on the signal indicative of the tilt angle, an interface from a plurality of interfaces configured to be displayed by the display, the plurality of interfaces being associated with different applications selectable by a user for execution; and
control the display to display the selected interface.

2. The device of claim 1, wherein the circuitry is configured to:
determine an arrangement of images based on the signal indicative of the tilt angle; and
control the display to display the arrangement of images.

3. The device of claim 2, wherein
the arrangement of images corresponds to the selected interface, and
the circuitry is configured to control the display to display the arrangement of images within the selected interface based on the signal indicative of the tilt angle.

4. The device of claim 1, wherein
the circuitry is configured to select the interface, from the plurality of interfaces, based on a previously determined correspondence between the selected interface and a tilt angle.

5. The device of claim 4, wherein
the correspondence is generated by receiving data corresponding to the tilt angle when an application corresponding to the interface is executed, and associating the interface with the acquired data corresponding to the tilt angle.

6. The device of claim 1, further comprising:
one or more position sensors configured to determine a current location of the device, wherein
the circuitry is configured to select the interface based on the signal indicative of the tilt angle and the current location of the device.

7. The device of claim 1, wherein
the circuitry is configured to determine an operating context based on the signal indicative of the tilt angle.

8. The device of claim 7, wherein
the operating context corresponds to a behavior exhibited by the user at a time of receiving the signal indicative of the tilt angle.

9. The device of claim 1, further comprising:
an audio input terminal configured to receive an audio jack, wherein
the circuitry is configured to determine when the audio jack is received by the audio input terminal.

10. A method of controlling a display configured to display a plurality of interfaces, the method comprising:
receiving a signal indicative of a tilt angle based on an input from one or more motion sensors;
selecting, based on the signal indicative of the tilt angle, an interface, of the plurality of interfaces, the plurality of interfaces being associated with different applications selectable by a user for execution; and
controlling the display to display the selected interface.

11. The method of claim 10, further comprising:
determining an arrangement of images based on the signal indicative of the tilt angle; and
controlling the display to display the arrangement of images.

12. The method of claim 11, wherein
the arrangement of images corresponds to the selected interface, and
the display is controlled to display the arrangement of images within the selected interface based on the signal indicative of the tilt angle.

13. The method of claim 10, wherein
the interface, of the plurality of interfaces, is selected based on a previously determined correspondence between the selected interface and a tilt angle.

14. The method of claim 13, wherein
the correspondence is generated by receiving data corresponding to the tilt angle when an application corresponding to the interface is executed, and associating the interface with the acquired data corresponding to the tilt angle.

15. The method of claim 11, further comprising:
determining, based on an input from one or more position sensors, a current location of a device, wherein
the interface is selected based on the signal indicative of the tilt angle and the current location of the device.

16. The method of claim 10, further comprising:
determining an operating context of the device based on the signal indicative of the tilt angle.

17. The method of claim 10, further comprising:
determining when an audio jack is received by an audio input terminal included on a device.

18. A system comprising:
one or more motion sensors configured to detect a tilt angle;
a display; and
circuitry configured to
receive a signal indicative of the tilt angle based on an output from the one or more motion sensors;
select, based on the signal indicative of the tilt angle, an interface from a plurality of interfaces configured to be displayed by the display, the plurality of interfaces being associated with different applications selectable by a user for execution; and
control the display to display the selected interface.

19. The system of claim 18, further comprising:
a touch panel interface configured to receive a touch input by the user, wherein
the circuitry is configured to control a selection corresponding to displayed selected interface based on a touch input received at the touch panel.

20. The system of claim 18, wherein the circuitry is configured to:
determine an arrangement of images based on the signal indicative of the tilt angle; and
control the display to display the arrangement of images.

* * * * *